3,451,790
METHOD OF SEPARATING NEPTUNIUM AND URANIUM VALUES

Sidney Katz, Oak Ridge, and George I. Cathers, Knoxville, Tenn., assignors to the United States of America as represented by the United States Atomic Energy Commission
No Drawing. Filed May 14, 1968, Ser. No. 728,911
Int. Cl. C01g 57/00
U.S. Cl. 23—326                                9 Claims

ABSTRACT OF THE DISCLOSURE

A method of separating neptunium values from a mixture containing neptunium hexafluoride together with uranium hexafluoride comprising contacting said mixture with sodium fluoride at a temperature of 100° to 250° C., thereby sorbing these hexafluorides on the sodium fluoride, converting the neptunium to a state in which it is more strongly sorbed than uranium hexafluoride, and selectively desorbing the uranium hexafluoride by heating the sodium fluoride to a temperature of 250° to 350° C.

Background of the invention

The invention described herein was made in the course of, or under, a contract with the United States Atomic Energy Commission.

Our invention relates to processes for separating volatile metal fluorides from each other and more specifically to processes for separating neptunium hexafluoride from uranium hexafluoride.

In one important method of recovering uranium values from spent nuclear fuels the fuel is fluorinated to produce uranium hexafluoride, thereby separating uranium values from metals which do not form volatile fluorides. However, some other metals present in the spent fuel, including neptunium, also form volatile fluorides, and methods must be provided for separating these volatile fluorides from uranium hexafluoride. Separation of uranium hexafluoride from other volatile fluorides has been achieved by selective sorption of one or more of the volatile fluorides on a nonvolatile metal fluoride. U.S. Patent No. 3,165,376 issued Jan. 12, 1965, to W. R. Golliher teaches a method of separating neptunium and uranium hexafluorides by passing a mixture of these metal fluorides through a bed of magnesium fluoride particles. The neptunium hexafluoride is sorbed by the magnesium fluoride and the uranium hexafluoride passes through. While this method is capable of separating uranium from neptunium values, recovery of the neptunium requires that it be removed from the magnesium fluoride by contacting the bed with an acidic aqueous solution. Other volatile metal fluorides sorbed on the $MgF_2$ mass together with neptunium hexafluoride are also removed in this step, and therefore additional separation steps are required to produce highly pure neptunium values; an additional disadvantage of this method is that the $MgF_2$ mass must be thoroughly dried before reuse.

Summary of the invention

It is accordingly one object of our invention to provide an improved method of separating neptunium values from uranium hexafluoride.

It is another object to provide a gas-solid sorption method of separating neptunium values from uranium hexafluoride wherein sorbed neptunium values can be removed from a sorbent bed by contacting the neptunium-loaded bed with a gas.

Other objects of our invention will become apparent from the following description and the appended claims.

In accordance with our invention we have provided a method of separating neptunium values from a gaseous mixture containing neptunium hexafluoride and uranium hexafluoride comprising: contacting said gaseous mixture with a sodium fluoride mass maintained at a temperature of 100° to 250° C. whereby uranium and neptunium hexafluorides are sorbed on said mass; selectively reducing the oxidation state of the sorbed neptunium values to a value less than six; removing sorbed uranium hexafluoride from the sodium fluoride mass; and removing substantially uranium-free neptunium values from the resulting sodium fluoride mass.

Our method achieves excellent separation of neptunium and uranium values and it is readily incorporated into fluoride volatility processes. Sodium fluoride is a better sorbent for neptunium hexafluoride than is magnesium fluoride, and neptunium having a high degree of purity is readily recovered from the sodium fluoride mass. The desorbed bed may be reused immediately after the neptunium values are removed.

Description of the preferred embodiments

In the first step of our process a gaseous mixture containing hexafluorides of neptunium and uranium is contacted with a bed of sodium fluoride particles. Methods of contacting gases with solids are well-known and do not form a part of our invention. Optimum conditions such as those relating to gas flow rates and sodium fluoride particle size and particle arrangement may readily be determined by workers in the art.

The bed of particles is maintained at a temperature of 100° to 250° C. during the step of contacting the gas mixture with the bed. Within this temperature range neptunium hexafluoride and uranium hexafluoride are sorbed on sodium fluoride. The optimum sorption temperatures for the neptunium and uranium hexafluorides do not overlap. Uranium hexafluoride is sorbed very rapidly at temperatures of 100° C. and greater, but at 175° C. and above the equilibrium pressure is great enough to cause significant losses. The sorption of neptunium hexafluoride is poor at 100° C., but it increases with an increase in the temperature and is excellent at 200° C.

The preferred temperature range is from 170° to 180° C., and, in the preferred method of carrying out the sorption step of our invention, a bed having a temperature variation from the inlet to the outlet is used, the temperature across the bed varying from 150° to 170° C. at one end and from 180° to 200° C. at the other end. The gases are sorbed quickly and a bed residence time of 5 to 10 seconds is adequate for a bed containing particles having a surface area of 1 to 3 square meters per gram.

The neptunium in the neptunium hexafluoride-sodium fluoride complex is then reduced, thereby producing a highly stable neptunium fluoride-sodium fluoride complex. The valence of neptunium in this state corresponds to an average value in the range of 4.5 to 5. The neptunium may readily be reduced merely by cooling the sodium fluoride mass and removing fluorine. In such a method the sodium fluoride mass containing sorbed uranium and neptunium fluorides is cooled to a temperature below 100° C., preferably to a temperature in the range of 20° to 30° C., and an inert gas such as nitrogen or helium is passed through the cooled bed. Using this method we have found that a period of two hours is long enough to reduce the neptunium. A longer period may be used, but serves no useful purpose.

The bed is then heated to a temperature at which uranium hexafluoride is desorbed from the sodium fluoride particles. This temperature may range from 225° to 400° C., preferably 250° to 300° C. An inert gas such as nitrogen or helium is passed through the bed to carry away the desorbed uranium hexafluoride.

The sodium fluoride mass, substantially free of uranium values and containing a neptunium fluoride-sodium fluoride complex, is then increased to a temperature of 400° to 500° C., preferably 425° to 475° C., and a fluorinating agent such as an interhalogen compound or preferably fluorine is brought into contact with the sodium fluoride. The fluorinating agent oxidizes sorbed neptunium values to neptunium hexafluoride which has a high equilibrium pressure at temperatures in excess of 450° C. The resulting desorbed neptunium hexafluoride may be collected by passing it into a cold trap maintained at a temperature below −70° C.

Having thus described our invention, the following example is given to illustrate it in more detail.

EXAMPLE

A gaseous mixture containing 640 milligrams of uranium as $UF_6$ and 77 milligrams of neptunium as $NpF_6$ is passed into a bed of NaF pellets maintained at a temperature of 175° C. The bed contains 2 grams of sodium fluoride having a surface area of 1–3 square meters per gram and is disposed in a column 0.75 centimeter in diameter and 5 centimeters long. The mixture is introduced into the column at a rate of 50 milliliters per minute. Ninety-four percent of the neptunium hexafluoride and 99.2 percent of the uranium hexafluoride sorb on the sodium fluoride.

The sodium fluoride bed is then cooled to 25° C. and nitrogen is forced through the bed at a rate of 50 milliliters per minute for 120 minutes. The neptunium sorbed on the bed has an average valence of 4.5 to 5.

The bed containing the reduced neptunium and the uranium hexafluoride is then heated to a temperature of 275° C. and nitrogen is passed through at a rate of 360 milliliters per minute to remove desorbed uranium hexafluoride. The desorption time to remove 98.1 percent of the uranium is 4 hours. Over 95 percent of the sorbed neptunium remains on the bed.

The sodium fluoride bed containing neptunium values is then heated to a temperature of 450° C. and fluorine gas at a rate of 50 milliliters per minute is passed through the heated bed for 90 minutes. The exit gases are passed into a sodium fluoride trap. The product contains over 80 percent of the starting amount of $NpF_6$ and less than 2 percent of the starting amount of $UF_6$.

The above example is given to illustrate, not to limit, our invention. Changes in temperatures, concentration of gases, types of inert or fluorinating gases may be made to accommodate process requirements and will be apparent to workers in the art.

We claim:
1. A method of separating neptunium values from a gaseous mixture comprising neptunium hexafluoride and uranium hexafluoride comprising:
    (a) contacting said gaseous mixture with a sodium fluoride mass maintained at a temperature of 100° to 250° C., whereby neptunium and uranium hexafluorides are sorbed on said mass;
    (b) selectively reducing the oxidation state of the sorbed neptunium values to a value less than six;
    (c) desorbing uranium hexafluoride from the sodium fluoride mass; and,
    (d) desorbing substantially uranium-free neptunium values from the resulting sodium fluoride mass.

2. The method of claim 1 wherein in step (b) the oxidation state of the neptunium is reduced to an average value of 4.5 to 5.0.

3. The method of claim 1 wherein in step (b) the oxidation state of the neptunium is reduced by cooling the sodium fluoride mass to a temperature below 100° C. and removing fluorine from the cooled mass.

4. The method of claim 3 wherein the sodium fluoride mass is cooled to a temperature of 20° to 30° C.

5. The method of claim 3 wherein said fluorine is removed from the sodium fluoride mass by passing an inert gas through said mass.

6. The method of claim 1 wherein in step (a) the sodium fluoride mass is maintained at a temperature of 150° to 200° C.

7. The method of claim 1 wherein in step (a) a temperature gradient is maintained across said sodium fluoride mass in the direction of the gas flow, the temperature in a first portion of said mass being maintained in the range of 150° to 170° C. and the temperature in a second portion of said mass being maintained in the range of 180° to 200° C.

8. The method of claim 1 wherein in step (d) the neptunium values are desorbed from the sodium fluoride mass by heating said mass to a temperature above 400° C. and contacting the heated mass with a fluorinating agent.

9. The method of claim 1 wherein in step (d) the neptunium values are removed from the sodium fluoride mass by heating said mass to a temperature of 425° to 475° C. and passing fluorine through the resulting heated mass.

References Cited

UNITED STATES PATENTS

| 3,165,376 | 1/1965 | Golliher | 23—337 |
| 2,982,604 | 4/1961 | Seaborg et al. | 23—343 |

OTHER REFERENCES

Reprocessing of Irradiated Fuels, Euraec 1832, Sept. 30, 1966.

Fluoride Volitility Processing, Ornl 4145, pp. 81–82, September 1967.

BENJAMIN R. PADGETT, Primary Examiner.

M. J. McGREAL, Assistant Examiner.

U.S. Cl. X.R.

23—343, 352